Jan. 24, 1928.
H. E. IVES
1,656,915
TRANSMISSION OF PICTURES BY ELECTRICITY
Filed Aug. 22, 1924   2 Sheets-Sheet 1
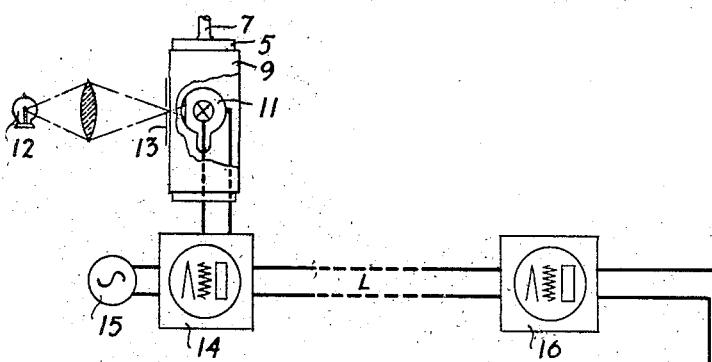
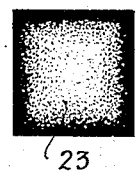
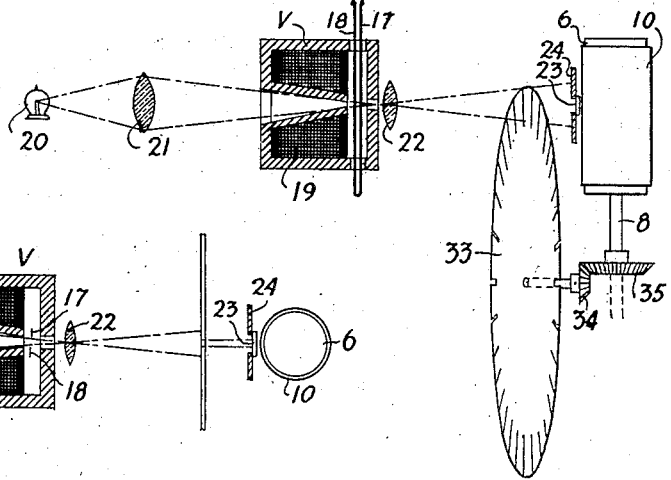
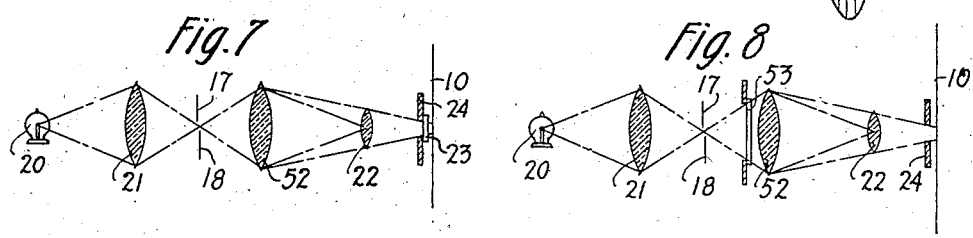
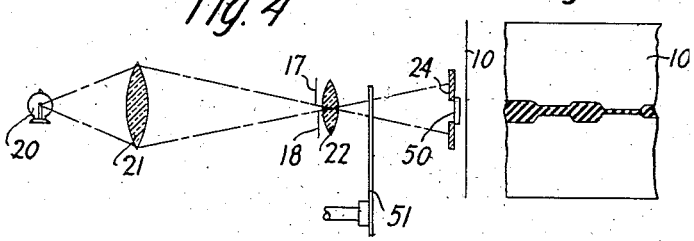
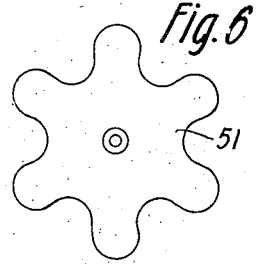
Inventor:
Herbert E. Ives
by ⟨signature⟩ Att'y Jan. 24, 1928.  
H. E. IVES  
1,656,915  
TRANSMISSION OF PICTURES BY ELECTRICITY  
Filed Aug. 22, 1924  2 Sheets-Sheet 2

Inventor:
Herbert E. Ives
by
Atty

Patented Jan. 24, 1928.

1,656,915

UNITED STATES PATENT OFFICE.

HERBERT E. IVES, OF MONTCLAIR, NEW JERSEY, ASSIGNOR TO WESTERN ELECTRIC COMPANY, INCORPORATED, OF NEW YORK, N. Y., A CORPORATION OF NEW YORK.

TRANSMISSION OF PICTURES BY ELECTRICITY.

Application filed August 22, 1924. Serial No. 733,463.

This invention relates to the transmission of pictures by electricity and more particularly to means for reproducing the picture in the form of dots of various sizes or lines of varying width.

An object of this invention is to accomplish the reproduction of pictures from electricity in a form suitable for use by the photoengraver. A reproduction in the form of dots of various sizes or lines of varying width meets this requirement.

One feature of this invention is an optical arrangement for converting a light beam of constant intensity into a light image of variable intensity by means of a light valve.

Another feature is the use of a variable density screen in combination with such an optical arrangement to effect the exposure of elemental areas of a light sensitive record blank in varying amounts.

Still another feature is the use of rotating discs of various kinds to break up such exposure into dots.

Another feature is an arrangement for using the shadow effects of the half tone screen process to accomplish these results.

In one embodiment of the invention, the picture characteristics are transmitted as modulations of a carrier wave. At the reproducing terminal, picture currents resulting from demodulation are used to operate a light valve, so arranged as to vary the effective area of a projection lens and so to vary the intensity of the image of a constant source of light. By means of a variable density screen graded from transparency at the center to opacity at the edges and a rotating sectored disc, dots of various sizes are produced on a light sensitive record blank, the size of the dots corresponding to the density of the corresponding elemental areas of the original picture. In a modified arrangement, the variable density screen is replaced by an aperture located at a definite distance from the record blank so as to obtain the shadow effect of a half tone screen.

The novel features which are considered characteristic of this invention are set forth with particularity in the appended claims. The invention, both as to its organization and method of operation together with other objects and advantages thereof, will be further explained in the following description having reference to the accompanying drawing.

Fig. 1 of the drawing is a schematic diagram illustrating a complete picture transmission system employing a projection lens the effective area of which is varied by a light valve, a graded density screen and a rotating sectored disc.

Fig. 2 is a diagram of the optical system of Fig. 1 partially in cross section as viewed from above.

Fig. 3 illustrates one form of graded density screen.

Fig 4 illustrates an optical arrangement employing a variable density screen graded on two sides only and a disc with a serrated edge for producing dots.

Fig. 5 illustrates the form of the exposed area produced by the system of Fig. 4 providing the disc is stationary.

Fig. 6 shows diagrammatically a form of disc with serrated edge.

Fig. 7 shows a modified optical system in which the effective area of the projection lens is varied by projecting an image of the light valve aperture in the central plane of the projection lens.

Fig. 8 shows a modification of Fig. 7 in which the variable density screen is located adjacent to the valve aperture projection lens whereby a physically larger variable density screen may be used.

The same reference characters are used throughout the several figures of the drawing to indicate the same elements.

Figure 9:
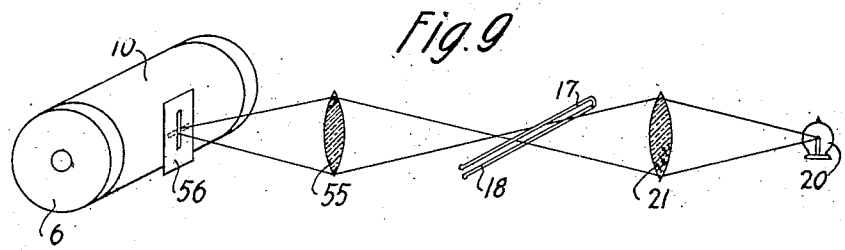
Fig. 9 illustrates partially in perspective, another modified optical system in which the variable aperture of the light valve varies in the direction of movement of the record blank.

Referring now to Fig. 1, two rotatable drums 5 and 6 are mounted on shafts 7 and 8 which are caused to rotate in any suitable manner. As the drums rotate they are caused to move axially with respect to the shafts. A transparency 9 of the picture to be transmitted is mounted on the drum 5 in the form of a cylinder. Mounted upon the drum 6 is a record blank 10 such as a sensitive photographic paper or film. Located within the drum 5 is a photo-electric cell 11, the electric characteristic of which is affected by the amount of light received from a source 12 through an aperture in screen 13. The amount of light reaching the photoelectric cell 11 is determined by the tone value of the elemental area of the transparency 9 which is opposite the aperture in screen 13 at any given time. The circuit of the photoelectric cell 11 is connected to a modulating device 14 whereby carrier waves from a source 15 are modulated and transmitted to the transmission line L. At the reproducing terminal light valve V is actuated by demodulated picture current from demodulator 16. The modulating and demodulating devices 14 and 16 respectively, may consist of electron discharge devices as indicated and as disclosed in a copending application of M. B. Long, Serial No. 681,347, filed December 18, 1923. A suitable arrangement for synchronously rotating the drums 5 and 6 is also disclosed in the Long application supra.

The light valve V is similar in general arrangement to the light valve disclosed in Patent No. 1,638,555, Aug. 9, 1927, of E. C. Wente, Serial No. 635,886 filed May 1, 1923. It consists of two wires 17 and 18 suspended in a magnetic field which is produced by coil 19. The aperture between the wires 17 and 18 varies with the intensity of the picture current which is proportional to the lights and shades of the transparency 9 at the sending terminal.

The problem is to break up the photographic impression on the film 10 which is made by the light passing through the valve V into a series of dots whose sizes shall vary with the tones of the original picture, i. e., with the light valve opening. To accomplish this result, light from a source 20 is directed by condensing lens 21 upon the variable aperture of the light valve, so that the image entirely covers the valve at its widest opening. A lens 22, located in close proximity to the light valve aperture forms an image of the condensing lens 21 upon a variable density screen 23 secured to an opaque screen 24 which has an aperture therein. The variable density screen 23 is located in close proximity to the film 10 mounted on drum 6. With this optical arrangement, the image on screen 23 remains of constant size but varies in intensity directly as the size of the aperture of the light valve. This results because the varying aperture in the valve varies the effective area of the lens 22.

Figure 13:
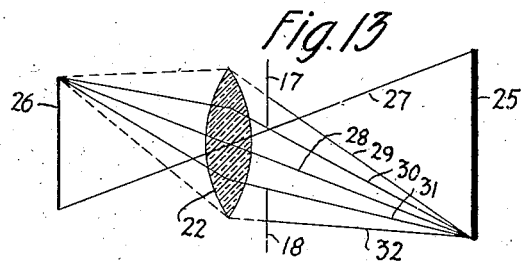
Fig. 13 illustrates how a variable intensity image is obtained from a constant intensity source by varying the effective area of a projection lens.

To explain this, reference will be made to Fig. 13. The line 25 respresents an elementary portion of the lens 21, while line 26 represents the image of that portion in the plane of the variable density screen 23. The size of the image 26 is determined by the rays 27 and 28 passing through the center of lens 22. From any given point in line 25, say the lower end, a pencil of rays represented by rays 28 to 32, inclusive, will pass through the lens 22 and focus at the upper end of line 26. If all of these rays were effective, the upper end of line 26 would be illuminated to maximum intensity. As shown in Fig. 13, however, the wires 17 and 18 of light valve V cut off rays 29 and 32 and by that amount decrease the illumination of the upper end of line 26. The screening effect of wires 17 and 18 is to reduce the effective area of lens 22. The intensity of illumination of each other point in line 26 is reduced in the same manner.

The variable density screen 23 is illustrated diagrammatically in Fig. 3, the transmission ranging from a maximum at its center to a minimum of practical opacity at its edges. The graduated image which will be thrown upon the light sensitive surface of film 10 through the graded screen 23 corresponds to the graded image caused by each aperture of a half tone screen due to the formation of a penumbra owing to the finite distance between the half tone screen and a photographic plate and the finite area of the projecting lens. This graduated image becomes by the processes of photographic development used in the preparation of half tone negatives, a well defined dot whose area is proportional to the intensity of the light acting.

The screen 23 is periodically illuminated each time that light from the source 20 passes through the slots in the sectored disc 33. The relative rotation of picture drum 6 and sectored disc 33 is so fixed by gears 34 and 35 that the dots are suitably positioned on the photographic film 10.

The variable density screen 23 can be made in a variety of ways but probably the simplest way is to prepare a large screen by photographic or other process and make small photographic reproductions on a substantially grainless photographic emulsion.

Figure 11:
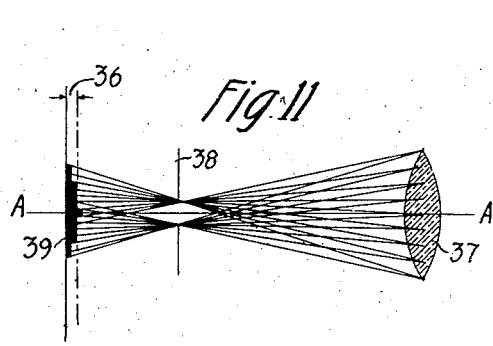
Figs. 11 and 12 illustrate the half tone effect.
Figure 12:
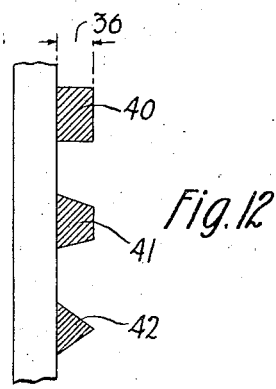

The half tone screen effect is illustrated in Figs. 11 and 12. The thickness of the photographic emulsion is represented by the space 36. A source of light of finite area is represented by lens 37. An opaque screen 38 is provided with an aperture through which the light may pass. Each elemental area of the lens 37 will produce a certain effect upon the corresponding finite area of the light sensitive surface. It is clear from Fig. 11 that the surfaces exposed to light from the different points do not coincide, but overlap. The maximum effect is obtained at a point where the axis A—A intersects the light sensitive surface. The effect on the photographic emulsion is indicated by the solid black surface 39. The emulsion is completely exposed over slightly more than half of its surface. The over exposure at the center of the surface 39 is no more effective than the complete exposure at either side. In Fig. 12, area 40 indicates a surface which has been completely exposed; area 41, a surface partially exposed; and area 42, one exposed just enough to leave a dot.

Referring now to Fig. 4, an arrangement similar to that of Fig. 2 is shown except that the screen 50 is graded on two sides only. A rotating disc 51 having a serrated edge as shown in Fig. 6 is provided to break the light beam into impulses to produce dots. Provided the disc 51 is stationary, the form of record which would be produced by this arrangement is shown in Fig. 5. This record is in the form of lines of varying width, the width of the line being determined by the intensity of the illumination of screen 50 and the thickness of the photographic emulsion as described in connection with Figs. 11 and 12.

In connection with Fig. 1 an arrangement for varying the effective area of the projection lens 22 has been described. The ideal arrangement would be to have the wires 17 and 18 of valve V located in the central plane of lens 22. This of course is physically impossible. An equivalent effect is obtained, however, in Fig. 7 by the use of a second projection lens 52. The strings 17 and 18 of the light valve V are located between condensing lens 21 and projection lens 52, so that an image of the aperture between strings 17 and 18 is projected on the central plane of projection lens 22. The image of the light valve aperture is therefore effective in the central plane of projection lens 22 to vary the effective area of this lens and consequently the intensity of illumination of the graded screen 23.

The total area of screen 23 is in any case exceedingly small and therefore comparatively difficult to make physically. For the coarsest grade of newspaper work, the screen 23 would be not greater than 1/50 of an inch on the side, while for a very fine grade of work it would be as small as 1/200 of an inch. In the modified arrangement shown in Fig. 8 which is quite similar to that of Fig. 7, the graded screen 53, located adjacent to lens 22, is substituted for the screen 23 of Fig. 7, a plain aperture in screen 24 being used, or screen 24 could be dispensed with. By the arrangement of Fig. 8, the graded screen 53 may be physically many times larger than the screen 23 of Fig. 7 and consequently more easily made up.

In the arrangements where a second projection lens 52 is employed, the lens 22 is so positioned as to form an image of some definite light area upon a plane in the neighborhood of the record blank. In Fig. 7 lens 22 forms an image of lens 52 on the aperture 23, while in Fig. 8 the image formed on the record blank 10, is that of aperture 53.

Figure 10:
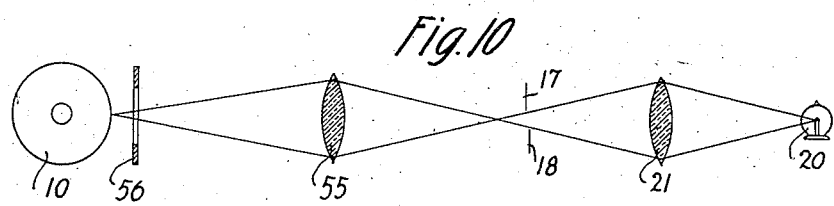
Fig. 10 is a side view of the system of Fig. 9 showing the relative locations of the record blank and slotted screen to produce the half tone effect.

In the modification of Figs. 9 and 10, the strings 17 and 18 of the light valve V are located parallel to the axis of picture drum 6, so that the variable size of the aperture is in the direction of the trace on the film 10. A relatively long narrow aperture in a screen 56 is arranged at right angles to the aperture formed by the strings 17 and 18. A screen graded on the sides only may cover the aperture in screen 56 or this aperture may be transparent and located at a finite small distance from the film 10 as shown in Fig. 10. With the latter arrangement, a true half tone effect, hereinbefore described in connection with Figs. 11 and 12, results to produce a line of varying width.

A rotating disc with serrated edge may be used with either of the arrangements of Figs. 7 to 10, inclusive, to break up the line exposure into dots.

Figure 14:
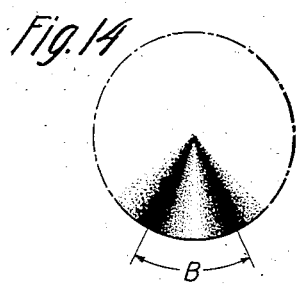
Fig. 14 shows diagrammatically a variable density transmission disc.

The form of disc illustrated in Fig. 14 may be used in place of a disc of Fig. 6. In this form, the disc is composed of sectors of graded density such as sector B where the transmission varies from transparency at the center of the sector to practical opacity at the edges. The number of sectors depends primarily upon the permissible speed of rotation of the disc.

While specific embodiments of the invention have been described in detail the invention is not so limited but is defined by the scope of the appended claims.

What is claimed is:

1. In a system for the transmission of pictures by electricity, a reproducing arrangement comprising a source of light of substantially constant intensity, a projection lens to form an image of said source, means to observe said image, a source of picture current varying as a function of the tone values of the elemental areas of the picture to be reproduced, means to vary the effective area of said lens in accordance with picture current from said source, and a graded density screen through which light from said lens passes.

2. In a system for the transmission of pictures by electricity, a reproducing arrangement comprising a source of light of substantially constant intensity, a projection lens to form an image of said source, means to observe said image, a source of picture current varying as a function of the tone values of the elemental areas of the picture to be reproduced, means to vary the effec- tive area of said lens in accordance with picture current from said source, a graded density screen through which light from said lens passes, and a sectored disc to break up said light into impulses.

3. In a system for the transmission of pictures by electricity, a reproducing arrangement comprising a source of light of substantially constant intensity, a projection lens to form an image of said source, means to observe said image, a source of picture current varying as a function of the tone values of the elemental areas of the picture to be reproduced, means to vary the effective area of said lens in accordance with picture current from said source, a graded density screen having gradations on two sides only through which light from said lens passes, and a rotating disc having a serrated edge to break up said light into impulses.

4. In a system for the transmission of pictures by electricity, a reproducing arrangement comprising a source of light of substantially constant intensity, a projection lens to form an image of said source, means to observe said image, a source of picture current varying as a function of the tone values of the elemental areas of the picture to be reproduced, means to vary the effective area of said lens in accordance with picture current from said source, a graded density screen having gradations on two sides only through which light from said lens passes, and a rotatating disc having a graded density sector to break up said light into impluses.

5. In a system for the transmission of pictures by electricity, a reproducing arrangement comprising a source of light of substantially constant intensity, a projection lens to form an image of said source, means to observe said image, a source of picture current varying as a function of the tone values of the elemental areas of the picture to be reproduced, means to vary the effective area of said lens in accordance with picture current from said source, a graded density screen having gradation on two sides only through which light from said lens passes, and a rotating disc having graded density sectors to break up said light into impluses.

6. In a system for transmitting pictures by electricity, a reproducing arrangement comprising a source of light of substantially constant intensity, a first projection lens, a second projection lens, a light valve so located that an image of the aperture of said valve is projected by said second lens in the central plane of said first lens, and means to vary the aperture of said valve in accordance with the characteristics of the transmitted picture.

7. In a system for transmitting pictures by electricity, a reproducing arrangement comprising a source of light of substantially constant intensity, a first projection lens, a second projection lens, a light valve so located that an image of the aperture of said valve is projected by said second lens in the central plane of said first lens, means to vary the aperture of said valve in accordance with characteristics of the transmitted picture, and a graded density screen through which light from said source passes.

8. In a system for transmitting pictures by electricity, a reproducing arrangement comprising a source of light of substantially constant intensity, a first projection lens, a second projection lens, a light valve so located that an image of the aperture of said valve is projected by said second lens in the central plane of said first lens, means to vary the aperture of said valve in accordance with characteristics of the transmitted picture, and a graded density screen located adjacent to said second projection lens.

9. In an optical arrangement for uniformly illuminating a finite surface with varying intensity, a surface to be illuminated, a source of light of substantially constant intensity, a first projection lens for projecting an image of said source on said surface, a variable aperture located in the path of the light from said source, a second projection lens so located that an image of said aperture is projected by said first projection lens upon the central plane of said second projection lens and an image of a given cross section of the light beam is projected upon said surface to be illuminated.

10. In a system for transmitting pictures by electricity, a reproducing arrangement comprising a light sensitive record blank, a source of light of substantially constant intensity, a first projection lens, a second projection lens, a light valve so located that an image of the aperture of said valve is projected by said second lens in the central plane of said first lens, means to vary the aperture of said valve in accordance with the characteristics of the transmitted picture, and a graded density screen located adjacent to said second projection lens in position to be imaged by the first projection lens upon the record blank.

11. In a system for transmitting pictures by electricity, a reproducing arrangement comprising a source of light of substantially constant intensity, a first projection lens, a second projection lens, a light valve so located that an image of the aperture of said valve is projected by said second lens in the central plane of said first lens, means to vary the aperture of said valve in accordance with characteristics of the transmitted picture, a graded density screen through which light from said source passes, and a sectored disc to break up said light into impulses.

12. In a system for transmitting pictures by electricity, a reproducing arrangement comprising a light sensitive record blank, an elongated aperture, a second elongated aperture at right angles to said first aperture and located a small distance from said record blank, means to illuminate said first aperture at substantially constant intensity, and a projection lens for projecting an image of said first aperture in the plane of said second aperture.

13. In a system for transmitting pictures by electricity, a reproducing arrangement comprising a rotating picture drum, a light sensitive record blank mounted on said drum, a screen having a long narrow aperture located a small distance from said record blank, a second elongated aperture located at right angles to the aperture in said screen, means to illuminate said elongated aperture at substantially constant intensity, and a projection lens for projecting an image of said elongated aperture in the plane of said screen.

14. In a system for transmitting pictures by electricity, a reproducing arrangement comprising a rotating picture drum, a light sensitive record blank mounted on said drum, a screen having a long narrow aperture located a small distance from said record blank, a variable elongated aperture formed by the movable wires of a light valve located at right angles to the aperture in said screen, means to illuminate said light valve aperture at substantially constant intensity, and a projection lens for projecting an image of said light valve aperture in the plane of said screen, said screen being so located that the photographic emulsion of the light sensitive record blank is exposed to full depth in the form of a line of varying width.

15. In a picture transmission system, a reproducing arrangement comprising a source of light of substantially constant intensity, a light sensitive record blank, a light valve with a variable aperture, a baffle plate with a definite portion thereof adapted to permit the passage of light rays, means for causing the light from said source to uniformly illuminate said portion of said plate, said plate being situated between said valve and said record blank, a first lens for focusing an image of said portion of said plate on said record blank, and a second lens for focusing an image of the valve aperture on the central plane of said first lens.

In witness whereof, I hereunto subscribe my name this 21st day of August A. D., 1924.

HERBERT E. IVES.